US012652659B2

(12) United States Patent
Tooher et al.

(10) Patent No.: US 12,652,659 B2
(45) Date of Patent: Jun. 9, 2026

(54) METHODS FOR UNLICENSED RESOURCE SELECTION

(71) Applicant: INTERDIGITAL PATENT HOLDINGS, INC.

(72) Inventors: J. Patrick Tooher, Montreal (CA);
Paul Marinier, Montreal (CA);
Ghyslain Pelletier, Montreal (CA)

(73) Assignee: InterDigital Patent Holdings, Inc.,
Wilmington, DE (US)

( * ) Notice: Subject to any disclaimer, the term of this patent is extended or adjusted under 35 U.S.C. 154(b) by 94 days.

(21) Appl. No.: 18/129,920

(22) Filed: Apr. 3, 2023

(65) Prior Publication Data

US 2023/0239848 A1     Jul. 27, 2023

Related U.S. Application Data

(63) Continuation of application No. 16/969,428, filed as application No. PCT/US2019/016801 on Feb. 6, 2019, now Pat. No. 11,622,350.

(Continued)

(51) Int. Cl.
| | |
|---|---|
| *H04W 72/0453* | (2023.01) |
| *H04W 24/02* | (2009.01) |

(Continued)

(52) U.S. Cl.
CPC ....... *H04W 72/0453* (2013.01); *H04W 24/02* (2013.01); *H04W 24/08* (2013.01);
(Continued)

(58) Field of Classification Search
None
See application file for complete search history.

(56) References Cited

U.S. PATENT DOCUMENTS 7,203,762 B2 *   4/2007   Yamada ................. H04L 45/22
                                                                    709/239
9,801,187 B1    10/2017   Zhou et al.
                          (Continued)

FOREIGN PATENT DOCUMENTS

| | | |
|---|---|---|
| CN | 107396386 A | 11/2017 |
| WO | 2018175577 A1 | 9/2018 |

OTHER PUBLICATIONS

Anonymous, "Bandwidth Parts Configuration and Operations", Intel Corporation, 3rd Generation Partnership Project (3GPP), Document R1-1707420, 3GPP TSG RAN WG1 Meeting #89, Hangzhou, China., May 15, 2017, 5 pages.

(Continued)

*Primary Examiner* — Faruk Hamza
*Assistant Examiner* — Cassandra L Decker
(74) *Attorney, Agent, or Firm* — VOLPE KOENIG

(57)     ABSTRACT

Methods and apparatuses are described herein for accessing an unlicensed spectrum using portions of a carrier's bandwidth (BW). For example, a wireless transmit receive unit (WTRU) may access a serving cell through an initial bandwidth part (BWP). The WTRU may be configured with a plurality of BWPs within an unlicensed frequency spectrum. The WTRU may then determine any of at least one monitoring period and at least one offset per each BWP. The WTRU may then monitor the BWPs based on any of the at least one monitoring period and the at least one offset. The WTRU may receive at least one signal from the serving cell. The signal may be at least one of a downlink control information (DCI), a synchronization signal block (SSB), a reference signal, or a preamble.

19 Claims, 7 Drawing Sheets

Related U.S. Application Data

(60) Provisional application No. 62/651,908, filed on Apr. 3, 2018, provisional application No. 62/629,935, filed on Feb. 13, 2018.

(51) Int. Cl.

| | |
|---|---|
| *H04W 24/08* | (2009.01) |
| *H04W 56/00* | (2009.01) |
| *H04W 72/0446* | (2023.01) |
| *H04W 74/0808* | (2024.01) |

(52) U.S. Cl.
CPC ... *H04W 56/0015* (2013.01); *H04W 72/0446* (2013.01); *H04W 74/0808* (2013.01)

(56) References Cited

U.S. PATENT DOCUMENTS

| | | | | |
|---|---|---|---|---|
| 2010/0309864 | A1* | 12/2010 | Tamaki | H04W 52/42 |
| | | | | 370/329 |
| 2013/0003672 | A1* | 1/2013 | Dinan | H04L 5/0023 |
| | | | | 370/329 |
| 2015/0098412 | A1* | 4/2015 | Yerramalli | H04W 74/0808 |
| | | | | 370/329 |
| 2015/0110066 | A1* | 4/2015 | Gaal | H04L 27/0006 |
| | | | | 370/330 |
| 2015/0131536 | A1 | 5/2015 | Kaur et al. | |
| 2016/0302226 | A1* | 10/2016 | Kim | H04W 72/23 |
| 2016/0381589 | A1* | 12/2016 | Zhang | H04L 5/0053 |
| | | | | 370/252 |
| 2017/0063479 | A1 | 3/2017 | Kim et al. | |
| 2017/0111217 | A1 | 4/2017 | Kim et al. | |
| 2018/0027589 | A1 | 1/2018 | Yang | |
| 2019/0141734 | A1 | 5/2019 | Lei et al. | |
| 2019/0150121 | A1 | 5/2019 | Abdoli et al. | |
| 2019/0174546 | A1 | 6/2019 | Jeon et al. | |
| 2019/0223160 | A1* | 7/2019 | He | H04W 68/005 |
| 2019/0372714 | A1* | 12/2019 | Jiao | H04L 1/0071 |
| 2020/0022148 | A1* | 1/2020 | Tang | H04L 5/0094 |
| 2020/0077432 | A1* | 3/2020 | Xiong | H04L 1/1861 |
| 2020/0112959 | A1* | 4/2020 | Gong | H04L 1/1822 |
| 2020/0228282 | A1* | 7/2020 | Kwak | H04L 5/0057 |
| 2020/0274750 | A1 | 8/2020 | Yi et al. | |
| 2020/0337069 | A1 | 10/2020 | Jiang et al. | |
| 2020/0366442 | A1 | 11/2020 | You et al. | |
| 2021/0007139 | A1 | 1/2021 | Fu et al. | |
| 2022/0030550 | A1* | 1/2022 | Shen | H04L 5/0053 |

OTHER PUBLICATIONS

Anonymous, "Considerations on NR-based Access to Unlicensed Spectrum", Coolpad, 3rd Generation Partnership Project (3GPP), Document R1-1720602, 3GPP TSG RAN WG1 Meeting 91, Reno, USA, Nov. 27, 2017, 3 pages.

Anonymous, "Evolved Universal Terrestrial Radio Access (E-UTRA)—Physical layer procedures (Release 15)", 3rd Generation Partnership Project (3GPP), Technical Specification Group Radio Access Network; Document 3GPP TS 36.213 V15.0.0. Dec. 2017, 493 pages.

Anonymous, "Remaining Issues on Bandwidth Part and Wideband Operation", Huawei and HiSilicon, 3rd Generation Partnership Project (3GPP), Document R1-1800018, 3GPP TSG RAN WG1 NR Ad Hoc Meeting, Vancouver, Canada, Jan. 22, 2018, 14 pages.

Anonymous, "Study on Licensed-Assisted Access to Unlicensed Spectrum" 3rd Generation Partnership Project (3GPP), Technical Specification Group Radio Access Network (Release 13), Document 3GPP TR 36.889 V13.0.0, Jun. 2015, 285 pages.

Anonymous, "Bandwidth Part Configuration and Frequency Resource Allocation", 3rd Generation Partnership Project (3GPP), Guangdong Oppo Mobile Telecom, Document R1-1710164, 3GPP TSG RAN WG1 NR Ad-Hoc#2; Qingdao, China, Jun. 27, 2017. 6 pages.

Anonymous, "Revised SID on NR-based Access to Unlicensed Spectrum", 3rd Generation Partnership Project (3GPP), Qualcomm Incorporated, Document RP-172021, 3GPP TSG RAN Meeting #77, Sapporo, Japan, Sep. 11, 2017, 5 pages.

Anonymous, "High Level Consideration on NR Unlicensed Band Operation", 3rd Generation Partnership Project (3GPP), Huawei and HiSilcon, Document R1-1711464, 3GPP TSG RAN WG1 NR Ad Hoc Meeting, Qingdao, China, Jun. 27, 2017, 4 pages.

Anonymous, "High Level Views on NR-U BWP", 3rd Generation Partnership Project (3GPP), Sony Corporation, Document R1-1720475, 3GPP TSG RAN WG1 Meeting 91, Reno, USA, Nov. 27, 2017, 4 pages.

Anonymous, "Timer Based BWP Switching", OPPO, 3rd Generation Partnership Project (3GPP), Document R2-1710126, 3GPP TSG RAN WG2 #99-Bis, Prague, Czech Republic, Oct. 9, 2017, 3 pages.

Anonymous, "Remaing Issues on Bandwidth Parts for NR", NTT Docomo, Inc., 3rd Generation Partnership Project (3GPP), Document R1-1713964, 3GPP TSG RAN WG1 Meeting #90, Prague, Czech Republic, Aug. 21, 2017, 5 pages.

Huawei et al., "On uplink hopping and DVRB", 3GPP TSG RAN WG1 Meeting 91, R1-1719829, 3GPP Draft, 3rd Generation Partnership Project (3GPP), Reno, USA; Nov. 18, 2017, 5 pages.

* cited by examiner

| Configuring the WTRU with a Plurality of BWSBs | ~ 30 |
| Monitoring the Plurality of BWSBs | ~ 34 |
| Determining a BWSB to be Active According to the Monitoring | ~ 36 |

| | |
|---|---|
| Configuring the WTRU with a Plurality of BWSBs | 30 |
| Receiving a BWSB Agnostic Grant for an UL Transmission | 32 |
| Monitoring the Plurality of BWSBs | 34 |
| Determining a BWSB to be Active According to the Monitoring | 36 |
| Transmitting the UL Transmission in the Active BWSB | 38 |

METHODS FOR UNLICENSED RESOURCE SELECTION

CROSS REFERENCE TO RELATED APPLICATIONS

This application is a Continuation of application Ser. No. 16/969,428, filed Aug. 12, 2020, which is a 371 National Phase of PCT/US2019/016801 filed Feb. 6, 2019, which claims the benefit of U.S. Provisional Application No. 62/651,908, filed Apr. 3, 2018, and U.S. Provisional Application No. 62/629,935, filed Feb. 13, 2018, which are incorporated by reference as if fully set forth

BACKGROUND

Operation in an unlicensed frequency band may be subject to some limits on the transmit power control (TPC), the RF output power and power density given by the mean Effective Isotropic Radiated Power (EIRP) and the mean EIRP density at the highest power level. It may further be subject to requirements on the transmitter out of band emissions. Such may be specific to bands and/or geographical locations.

For New Radio (NR) unlicensed, the following areas may be considered: NR-based operation in unlicensed spectrum, including initial access, scheduling/hybrid automatic repeat request (HARQ), and mobility, along with coexistence methods with Long Term Evolution-Licensed Assisted Access (LTE-LAA) and other incumbent radio access technologies (RATs), NR-based LAA cell connected with an LTE or NR anchor cell, as well as NR-based cell operating standalone in unlicensed spectrum.

SUMMARY

A wireless transmit receive unit (WTRU) operable in new radio (NR) unlicensed frequency spectrum may be configured to monitor multiple bandwidth parts (BWPs). Monitoring multiple BWPs by a WTRU may comprise attempting by the WTRU to receive an indication that a BWP of a plurality of BWPs has been accessed by the cell. Alternatively, or additionally, monitoring multiple BWPs by the WTRU may comprise performing Listen Before Talk (LBT) by the WTRU on a plurality of BWPs to attempt to acquire the channel. The WTRU may further use a timer to determine when the active BWP is deactivated and monitoring of multiple BWPs may resume. The WTRU may be further scheduled for a transmission that may be performed on any one of a set of BWPs, by for example, receiving a BWP agnostic uplink grant. The WTRU may then select an active BWP in the set of BWPs by applying LBT to the set of BWPs. The WTRU may then apply the BWP agnostic grant to the selected active BWP for the granted uplink transmission. The WTRU may further perform radio link monitoring (RLM) in both active and monitoring states of a BWP. The WTRU may perform measurements on a monitored BWP during and/or outside of channel occupancy time (COT). After the measurements, the WTRU may transmit a measurement report on the monitored BWP during and/or outside of COT. A fallback and/or default BWP may be used in case of inability to access carrier on the monitored BWP. The WTRU may also use BWP link monitoring rules to monitor radio links associated with the WTRU.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Example Networks for Implementation of the Embodiments

Figure 1A:
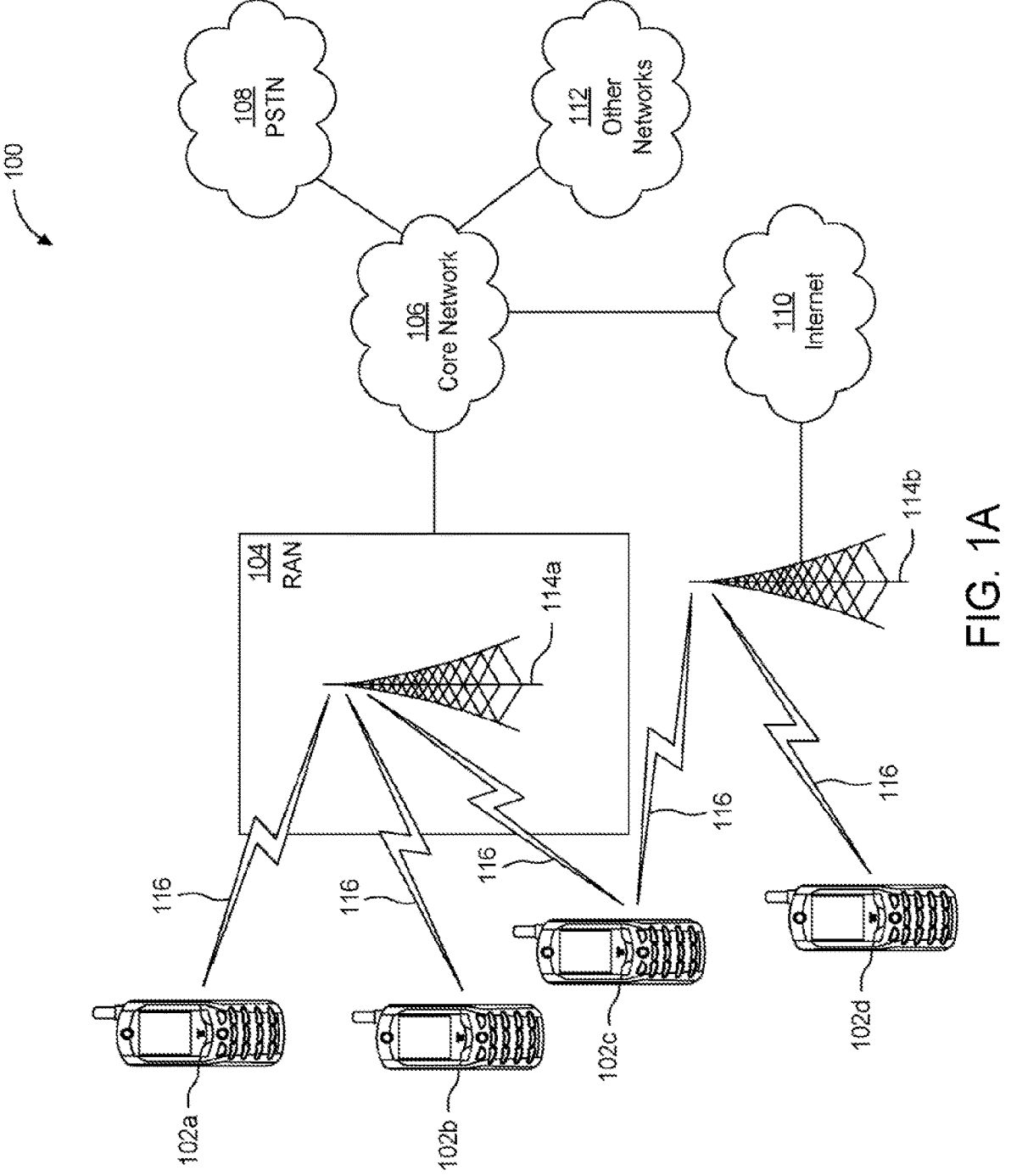
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
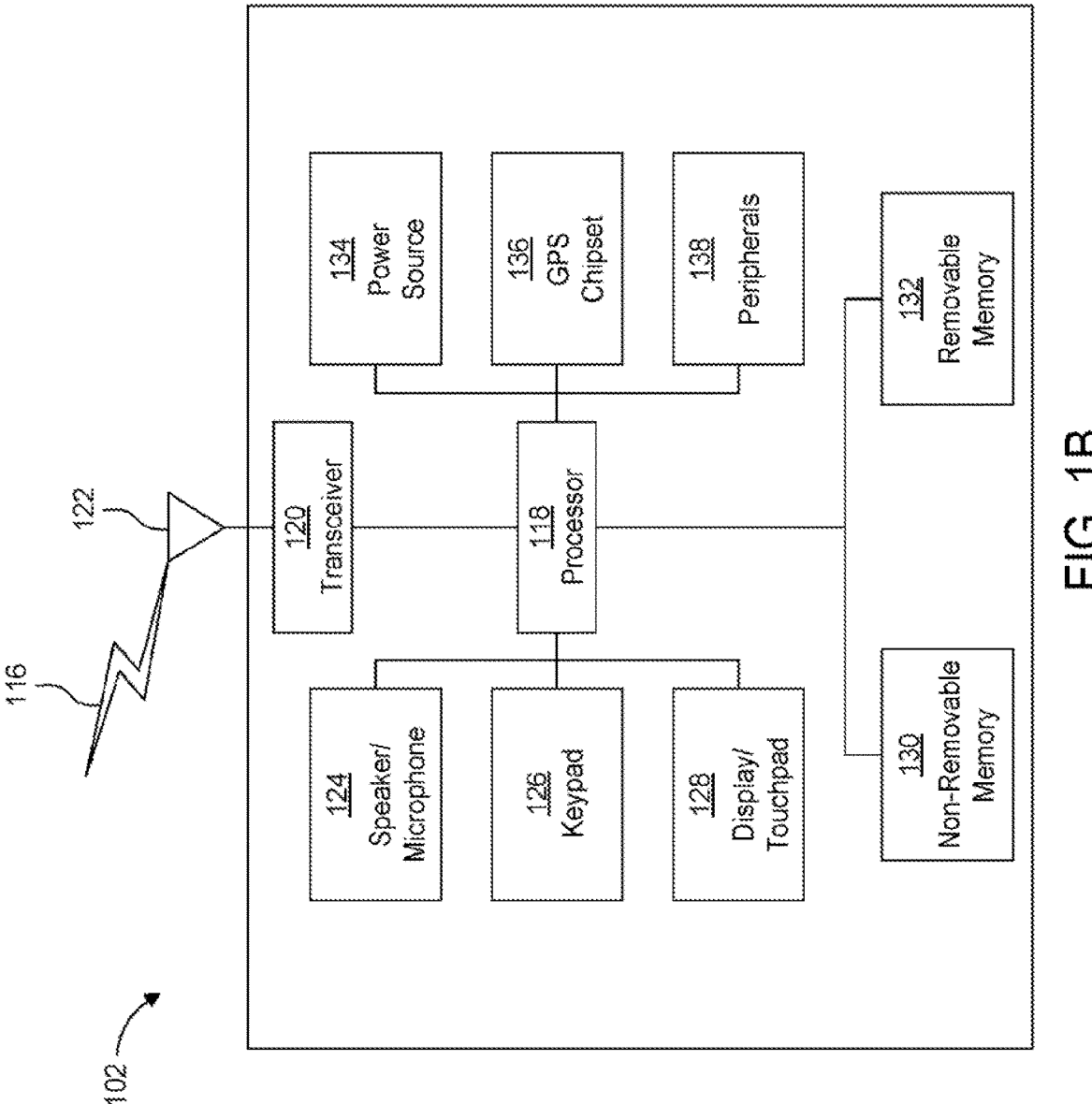
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
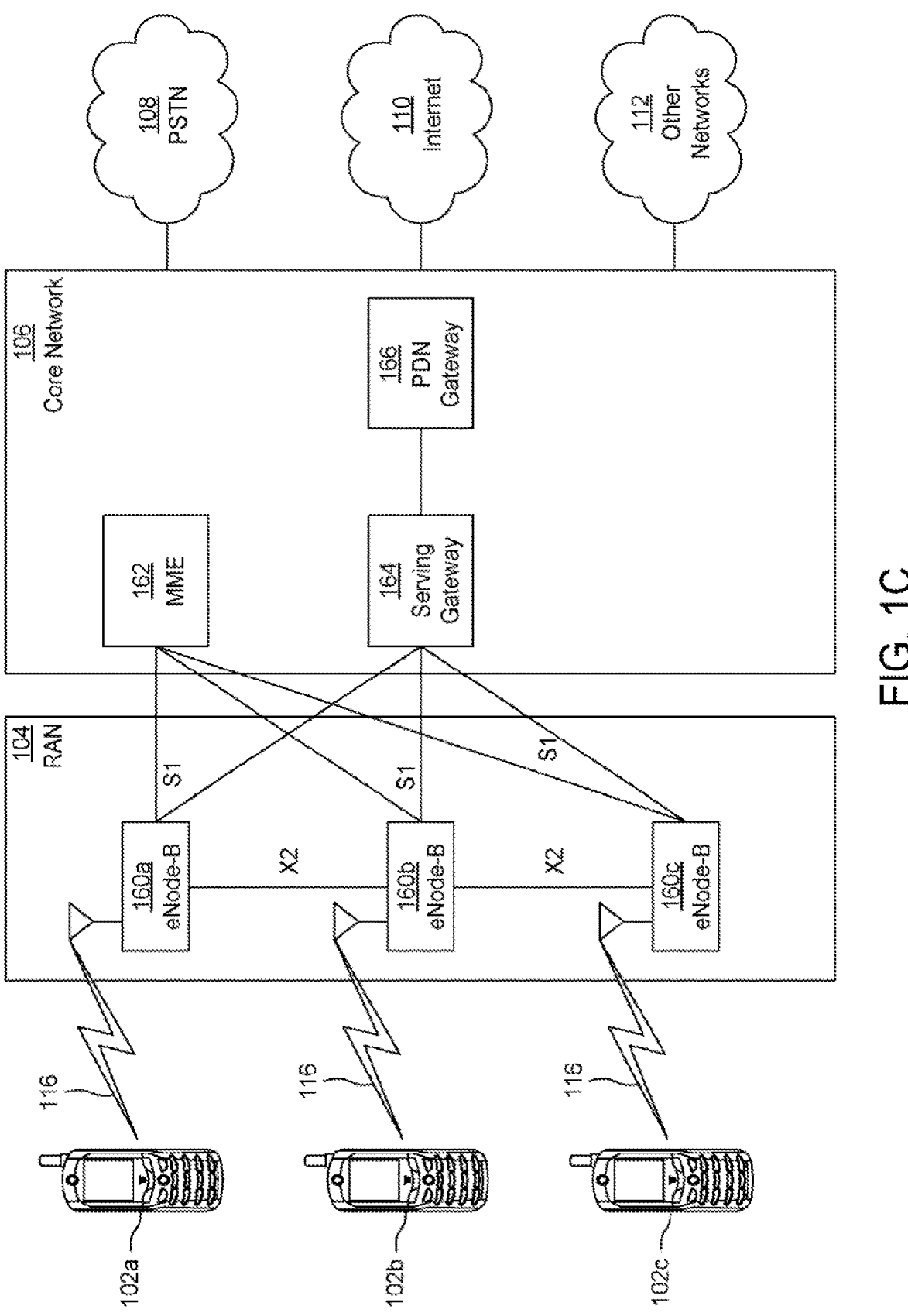
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
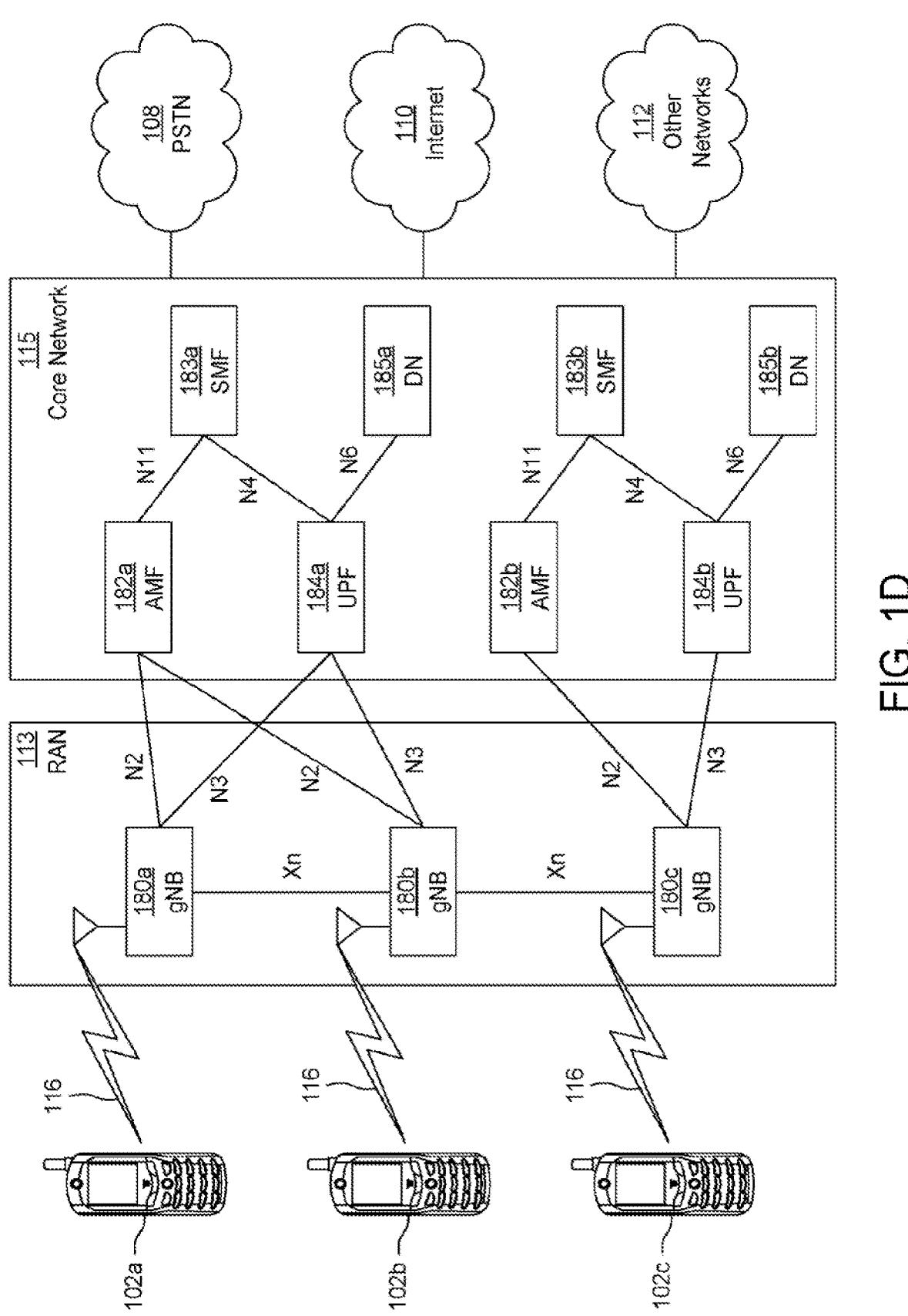
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements is depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*ab*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Operation in Unlicensed Spectrum

Operation in an unlicensed frequency band may be subject to requirements on any of a Nominal Channel Bandwidth (NCB) and a Occupied Channel Bandwidth (OCB), for example, that are defined for unlicensed spectrum in the 5 GHz region. The Nominal Channel Bandwidth may be a widest band of frequencies inclusive of guard bands assigned to a single channel, and, for example, may be at least 5 MHz. The Occupied Channel Bandwidth may be a bandwidth containing 99% of the power of the signal, and may be between 80% and 100% of the declared NCB. For example, during an established communication, a device may operate temporarily in a mode where its OCB may be reduced to as low as 40% of its NCB, with a minimum OCB of 4 MHz.

Channel access in an unlicensed frequency band typically may use a Listen Before Talk (LBT) mechanism. LBT may be used independently of whether a channel is occupied. The LBT procedure may be defined as a mechanism by which equipment applies (e.g., a device performs) a clear channel assessment (CCA) check, for example, before using the channel. The CCA may utilize at least energy detection to determine the presence or absence of other signals on a channel, for example, in order to determine if a channel is any of occupied or clear. Usage of LBT in the unlicensed bands may be expected according to European and Japanese regulations. Carrier sensing via LBT may be used for fair sharing of the unlicensed spectrum and hence it may be considered to be an important feature for fair and friendly operation in the unlicensed spectrum in a single global solution framework. If, for example, after a first CCA, the channel is assessed as clear, the LBT may be followed by a subsequent transmission. If, for example, after the first CCA, the channel is assessed as occupied, the LBT may comprise a subsequent CCA.

For frame-based systems, LBT may be characterized by any of a CCA time (e.g., around 20 μs), a channel occupancy time (COT) (e.g., between 1 ms and 10 ms), an idle period (e.g., at least 5% of channel occupancy time), a fixed frame period (e.g., corresponding to the addition of the channel occupancy time and an idle period), a short control signaling transmission time (e.g., maximum duty cycle of 5% within an observation period of 50 ms), and a CCA energy detection threshold. For frame-based systems, a CCA may be performed periodically (e.g., once every fixed period).

For load-based systems (e.g., transmit/receive structure may not be fixed in time), if the channel is assessed as occupied (e.g., after the first CCA), the LBT may perform an extended CCA, for example, by observing the channel for a duration of N channel observation times. LBT may be characterized by the number N corresponding to the number of clear idle slots in extended CCA, for example, instead of the fixed frame period. N may be selected within a range, for example randomly.

Deployment scenarios may include any of different standalone NR-based operation, different variants of dual connectivity operation (e.g., E-UTRAN New Radio Dual Connectivity (EN-DC) with at least one carrier operating according to the LTE radio access technology (RAT), NR DC with at least two sets of one or more carriers operating according to the NR RAT), and/or different variants of carrier aggregation (CA) (e.g., including different combinations of zero or more carriers of each of LTE and NR RATs). For example, in LTE, the following functionalities may be considered for an LAA system.

First, LBT for clear channel assessment (CCA) as previously described may be considered for a LAA system.

Second, discontinuous transmission on a carrier with limited maximum transmission duration is described herein. In unlicensed spectrum, channel availability may not always be guaranteed. In addition, certain regions such as Europe and Japan may expect a transmission burst in the unlicensed spectrum to be bounded by a maximum duration. Hence, discontinuous transmission with limited maximum transmission duration may be an expected functionality for LAA.

Third, carrier selection is described herein. As there is a large available bandwidth of unlicensed spectrum, carrier selection may be expected for LAA nodes, for example, to select the carriers with low interference to achieve good co-existence with other unlicensed spectrum deployments.

Fourth, transmit power control is described herein. Transmit power control (TPC) may be a regulatory requirement in some regions by which the transmitting device should be able to reduce the transmit power, for example, in a proportion of 3 dB or 6 dB, compared to the maximum nominal transmit power.

Fifth, radio resource management (RRM) measurements including cell identification is described herein. The RRM measurements including cell identification may enable mobility between secondary cells (SCells) and robust operation in the unlicensed band.

Sixth, channel state information (CSI) measurement, for example, including channel and interference measurement, is described herein. A WTRU that is operating in an unlicensed carrier may also support frequency/time estimation and synchronization functions to enable RRM measurements and for successful reception of information on the unlicensed band.

Operation in New Radio (NR)

In NR, a WTRU may operate using BWPs in a carrier. First, a WTRU accesses the cell using an initial BWP. The WTRU may then be configured with a set of BWPs to continue operation. At any given moment, a WTRU may have one active BWP. Each BWP is configured with a set of control resource sets (CORESETs) within which a WTRU may blind decode PDCCH candidates for scheduling, among other things.

Meanwhile, in NR, a WTRU may operate using variable transmission duration and feedback timing. Variable transmission duration may include any of a physical downlink shared channel (PDSCH) or physical uplink shared channel (PUSCH) occupying a contiguous subset of symbols of a slot. Variable feedback timing may include DL assignment downlink control information (DCI) having an indication to provide (e.g., including information indicating) feedback timing for the WTRU, for example, by pointing to a specific physical uplink control channel (PUCCH) resource.

There are two types of PUCCH resources in NR, short PUCCH and long PUCCH. The former can be done over one or two OFDM symbols, while the latter may be up to fourteen OFDM symbols. Each PUCCH type has multiple formats depending on the payload.

For 5G NR, very large bandwidths (BWs) are supported. Furthermore, using mmW, large swaths of spectrum may be used for unlicensed access. In such a scenario, it may be detrimental to assume that any access of the unlicensed spectrum should be using the entire carrier BW. That is, in such a scenario, the probability that the entire carrier BW is available may diminish as the size of the carrier increases. Further, in such a scenario, most transmissions may not need the entire carrier BW anyway.

According to embodiments, an unlicensed spectrum may be accessed using portions (e.g., a bandwidth part (BWP) of a carrier's BW. For example, a WTRU may use only a portion of the carrier BW that is needed for a transmission. According to embodiments, access using portions of the carrier's BW may be flexible, for example, by allowing flexible associations between a cell or WTRU and a subset of the over-all BW. In the case of flexible associations, the probability of being repeatedly blocked by a single interferer may be reduced. According to embodiments, in a case of using portions of a carrier BW, a WTRU may operate on a full carrier BW, for example, while complying with regulations (e.g., as discussed above) and, for example, without being penalized with an undue increase in latency.

Configuration of Bandwidth Sub Bands (BWSBs) in Unlicensed Frequency Bands

According to embodiments, an unlicensed frequency band may be divided in a plurality of bandwidth sub bands (BWSBs), wherein each BWSB is a subset of the unlicensed frequency band. A BWSB may be any of: (1) a NR BWP as previously described applied to an unlicensed frequency band; and (2) a sub band of a single NR BWP in the unlicensed spectrum. For the sake of clarity and without loss of generality, embodiments are described herein using the terms "BWP", and "set (or plurality) of BWPs", but they are equally applicable to any kind of BWSB and set (or plurality of) BWSBs, wherein a BWSB may correspond to a NR BWP or may correspond to a sub-division of a single NR BWP. For example, embodiments described herein may be applicable to a case of a single NR BWP in unlicensed spectrum being divided in a plurality of BWSBs.

A BWSB (which may be interchangeably referred to as a BWP herein) may be any of a DL BWSB, or an UL BWSB. A BWSB may also include both a DL BWSB and an associated UL BWSB. With reference to embodiments described herein, unless explicitly described as DL or UL, a BWSB (or BWP) may refer to any of a DL BWSB (or DL BWP), an UL BWSB (or UL BWP), or both.

Configuration of BWPs on unlicensed carrier is described herein. According embodiments, a WTRU may be configured with a set of BWPs, for example, a set of BWPs that the WTRU may monitor for activity from a serving cell. Such a set of BWPs may be named "monitored" BWPs. The set of monitored BWPs may be a subset of all configured BWPs.

According to embodiments, for each monitored BWP, a WTRU may be configured with any of a monitoring period and an offset. The timing of the monitoring period and offset may be relative to any of a timing obtained from a licensed carrier (e.g., LAA) or to a timing obtained upon cell selection of initial access of the unlicensed carrier. The configurable monitoring period and offset may determine (e.g., indicate) a set of occasions (e.g., repeatedly occurring in time, periodic or aperiodic times) for assessing whether a BWP is active or not. The repeated occasions may be separated from each other according to a configurable monitoring period. The offset may be an amount of time, for example, the time interval between a periodic reference time and the occurrence of the occasion. The occasion may have a configurable duration, for example, representing the amount of time during which a WTRU may assess whether a BWP is active or not. However, the present disclosure is not limited thereto, and for example, the configurable duration may represent the amount of time during which a WTRU may not assess whether a BWP is active. A configurable duration may be any of a number of slots, a number of symbols, a number of groups of symbols, or a number of time units.

According to embodiments, monitoring a BWP may include monitoring an UL BWP by repeatedly listening to a channel of the UL BWP, for example, to assess whether the channel is clear or not, at configurable and/or repeated occasions, (which may be referred to as channel listening occasions). Channel listening may be performed using CCA or LBT. For the sake of clarity and without loss of generality the embodiments described herein may be described with LBT as a channel listening/acquisition mechanism for checking whether a channel is acquirable. However, embodiments described herein are not limited to LBT, and any other kind of channel listening/acquisition technique adapted to determine whether a channel is acquirable may be applicable to the embodiments described herein. As referred to herein, the channel listening occasions may also be LBT occasions. According to embodiments, monitoring a BWP may include monitoring a DL BWP by repeatedly attempting to receive a transmission from a serving cell, for example, at configurable and/or repeated occasions (which may be referred to as monitoring occasions).

According to embodiments, at each monitoring occasion (e.g., determined according to any of the monitoring period and the offset of a BWP), a WTRU may attempt to receive a transmission from a serving cell. The transmission may be any of a DCI, a synchronization signal block (SSB), a reference signal (RS), or a preamble-like transmission. In a case of the DCI transmission, the WTRU may attempt blind detection of a DCI format, for example, in at least one search space in the monitored BWP(s). In a case of the SSB transmission, the WTRU may attempt to receive a SSB transmission (e.g., or a component thereof), for example, any of a primary synchronization signal (PSS), a secondary synchronization signal (SSS), a physical broadcast channel (PBCH), or a channel state information reference signal (CSI-RS). In a case of the RS transmission, the WTRU may attempt to receive the RS (e.g., CSI-RS, Demodulation reference signal (DM-RS), phase training-reference signal (PT-RS)). In a case of the preamble-like transmission, the WTRU may attempt to detect a sequence on a set of resource that may map to a preamble indicating that the gNB has acquired the BWP.

According to embodiments, a WTRU may be configured with multiple BWPs, for example, to be monitored according to a configurable schedule. Each of the multiple BWPs may be configured with a same monitoring period, and for example, with different offsets. In such a configuration, the WTRU may cycle through the BWPs, for example, to attempt to determine if a DL transmission is present and/or if a channel is available for an UL transmission. The configurable schedule (e.g., the monitoring period and the different offsets corresponding to the different BWPs) may be received by the WTRU, for example, from a gNB in a signaling message.

According to embodiments, any of the multiple BWPs or the configurable schedule may be preconfigured in the WTRU. For example, the WTRU may be preconfigured according to any of factory setting parameters, a network configuration, a default configuration, etc. According to embodiments, any of the multiple BWPs or the monitoring schedule configuration (e.g., the configurable schedule) may be received by the WTRU in a signaling message (e.g. in a broadcasted message or via RRC configuration). According to embodiments, any of a set of BWPs or a configurable schedule may be preconfigured in the WTRU and further updated by a reception of a signaling message. Any signaling message for carrying and/or updating the configuration of any of the set of BWPs or the monitoring schedule is compatible with any of the present embodiments.

According to embodiments, the WTRU may receive a DCI indicating a BWP is becoming active. The WTRU may monitor PDCCH candidates in the monitored BWPs (e.g., at specific monitoring occasions). The WTRU may perform blind detection on a subset of DCI formats. A received DCI for (e.g., indicating) activation of a BWP may also include scheduling information, for example, for any of a first DL assignment or UL grant. A DCI may be received at any time during a COT. A COT may be defined as the amount of time during which a channel is occupied by any number of nodes. A DCI received at any time during a COT may also be used to indicate (e.g., to any number of WTRUs) a change of active BWPs at an indicated time (e.g., the DCI may include an information indicating at which time a new BWP may be active). The WTRU may stop monitoring (e.g., no longer check whether a channel acquisition DCI is transmitted) the BWPs, for example, at the indicated time. The indicated time may be, for example, included in the DCI.

According to embodiments, a WTRU may be configured with a set of resources on which to perform measurements on a monitored BWP. Resources may include, but are not limited to, any of frequency channels and time slots. According to embodiments, such resources may be valid, for example, only in a case where the WTRU has determined that the gNB has acquired the BWP for transmission. According to embodiments, such resources may be valid for measurements (e.g., a WTRU may perform measurements on such resources), for example, only if, or regardless of if, the gNB has acquired the BWP for transmission. For example, a WTRU may be configured with zero power channel state information reference signal (e.g., ZP CSI-RS) resources on which it may measure BWP occupancy. Such BWP occupancy may be determined, for example, as a function of any of: (1) a number of occasions when no activity is determined on the resource; (2) a percentage of occasions when activity (or no activity) is determined on the resource; (3) an energy level detected on the resource; and (4) a percentage of occasions where energy level exceeds a threshold associated with the resource.

According to embodiments, a WTRU may report measurements taken (e.g., performed) on a monitored BWP, for example, by acquiring the channel (e.g. of the monitored BWP) and using a configured resource on which to report such measurements. The channel (e.g. of the monitored BWP) may be acquired (e.g., is acquirable) using rules described herein. The WTRU may report measurements taken (e.g., performed) on a set of BWPs by acquiring a BWP (e.g., any one BWP from the set for which measurements have been acquired and/or performed, or any other BWP for which the WTRU may acquire the channel) and transmitting the measurements (e.g., measurement report(s)) for any number of BWPs on a configured resource of the acquired BWP. As described further below, a WTRU may acquire a BWP by (e.g., successfully) acquiring the channel of a BWP according to embodiments described herein.

According to embodiments, a WTRU may be configured with resources (e.g., reference signal resources) on which to perform measurements for one or more BWP(s). There may be a case where the WTRU may not detect a reference signal resource (e.g., due to the gNB not acquiring the BWP for transmission). The WTRU may receive any of a configuration or an indication that provides a mapping of previously transmitted resources. Such configuration may be received by the WTRU in another (e.g., future) transmission, for example, to enable the WTRU to determine that an undetected RS was not transmitted by the gNB, and, for example, to better formulate measurement reports (e.g., by ignoring non-transmitted RSs, or by using the knowledge in determination of a measurement report value). Such a mapping may be provided in a transmission, for example, that may occur in any of the BWP for which the RS is configured or another BWP monitored by the WTRU.

According to embodiments, there may be a case where the WTRU determines that a COT is ongoing (e.g., due to any of the WTRU acquiring the channel or the reception of an indication that the channel/BWP has been acquired by the gNB) on a BWP (or a set of BWPs). In such a case, the WTRU may assume that any RS configured to be transmitted on non-acquired BWPs are to be considered to not have been transmitted. According to embodiments, a WTRU may be configured with measurement gaps within a COT, for example, to detect RSs transmitted in other BWPs. Such measurement gaps may be any of semi-statically defined or dynamically received from the network (e.g., indicated upon the network acquiring the required BWP to transmit the RS).

According to embodiments, a WTRU may be configured with resources to transmit UL RS. In a case of transmitting UL RS, the WTRU may indicate to the network any successful (and/or unsuccessful) RS transmission due to channel acquisition.

According to embodiments, a WTRU may be configured with resources to transmit an RS on a second (e.g., additional) BWP during a COT for a first acquired BWP. In such a case, the WTRU may be provided RS transmission gaps in the first BWP during which it may attempt to acquire the second BWP and transmit the RS on the acquired second BWP. Upon returning to the first BWP with the original COT, the WTRU may perform LBT (e.g., a shorter LBT), for example, to reacquire the first BWP.

Determining a BWP is Active

Determination of active BWP is described herein. According to embodiments, a WTRU configured with a set of monitored BWPs may not have an active BWP. An active BWP may be defined as any of: the cell has acquired the BWP, for example, for any of DL transmission or UL transmission, or the WTRU has acquired the BWP, for example, for any of UL transmission or DL transmissions.

According to embodiments, there may be a case where a BWP includes a DL BWP associated with an UL BWP, and the DL BWP has been acquired by the gNB for a DL transmission. In such a case, any of (e.g., both) the DL BWP and the associated UL BWP may be determined active. There may be a case where the channel of the UL BWP has been successfully acquired by the WTRU. In such a case, any of (e.g., both) the UL BWP and the associated DL BWP may be determined active.

According to embodiments, in a case where a BWP is activated (e.g. by a successful acquisition of any of the DL BWP by the cell or the UL BWP by the WTRU), the WTRU may operate according to any of the following variants. In a first variant, in the case where a BWP is active, any configured DL transmissions may be valid. For example, any periodic RS may be assumed present if a BWP is active. In another example, the PDCCH monitoring occasions (e.g., determined according to any of periodicity and offset of the configurable schedule) of any number of search spaces may be used, and, for example, the WTRU may perform blind detection on (e.g., the applicable) PDCCH candidates. For example, SSB may be transmitted. SPS (Semi-Persistent Scheduling) DL transmissions may be deemed present, for example, only when a BWP is active.

In a second variant, in a case where a BWP is active, any configured UL transmissions may be valid, for example, without requiring a preliminary channel listening such as LBT and/or with requiring a short LBT. There may be a case including any of the following: random access resources are valid, PUCCH resources are valid, grant-free UL transmission may be performed, or SPS UL transmissions may be deemed possible only when a BWP is active.

In a third variant, in a case where a BWP is active, radio link monitoring (RLM) measurements may be performed on applicable RS. In a fourth variant, in a case where a BWP is active, a previously configured beam pair may be valid in the BWP. The validity of a beam pair may depend on any of: (1) whether the beam pair was used in the same or an adjacent BWP (e.g., a previously configured beam pair for a BWP may only be valid in that BWP); or (2) whether the beam pair was deemed (e.g., determined, recently) applicable. For example, the validity of a beam pair may expire in a case where the BWP has been inactive, for example, more than a configured amount of time. Any of the embodiments discussed herein may use (e.g., implement, perform, etc.) any combination of the first, second, third, or fourth variants.

UL-Based BWP Activation

WTRU-based determination and indication of an active BWP are described herein. In a case of WTRU-based (which may also be referred to as UL-based) BWP acquisition, according to embodiments, a WTRU may perform a channel acquisition, such as for example, LBT on any number of monitored BWPs. In such a case, the LBT granularity may be per BWP. According to embodiments, LBT may be directional (e.g., beam-based). The WTRU may use any of a previously valid beam or set of beams tied to a BWP. Such a beam association may depend on an amount of time since the beam was last used on the BWP. There may be a case where there may no longer be a valid beam association with a BWP. In such a case, the WTRU may cycle through a set of (e.g., possible) beams to perform LBT for acquiring the BWP.

According to embodiments, a BWP may be determined active on condition the channel of BWP is acquirable (via, for example, a successful acquisition of the channel of the BWP). A successful channel acquisition (e.g. a check whether a channel is acquirable) may be (e.g., optionally) followed by a (e.g., subsequent) UL transmission. In a first variant a BWP may be activated (e.g., only) upon a successful channel acquisition. In other words, according to this first variant, once the channel has been successfully acquired (or checked as acquirable), no subsequent UL transmission needs to be performed for activating the BWP. The BWP may be activated in a case where the channel is available for transmission. For example, the BWP may be activated at the end of the channel acquisition process, which may be when the channel is considered as available (e.g. acquirable) for transmission by the WTRU. In a second variant, a BWP may be activated upon a successful channel acquisition followed by a (e.g., subsequent) transmission (as described below in further details). In other words, according to this second variant, a (e.g., subsequent) UL transmission may be transmitted (e.g., needs to be started) for activating the BWP. The BWP may be activated, for example, at any of the beginning or the end of the UL transmission. In a third variant, a BWP may be activated upon a successful channel acquisition, for example, followed by a (e.g., subsequent) successful transmission. In other words, according to this third variant, a (e.g., subsequent) UL transmission should be transmitted (e.g., may need to be performed), for example, in order to (e.g., successfully) activate the BWP. The BWP may be activated, for example, in a case where a positive acknowledgement is received from the gNB.

According to embodiments, the WTRU may perform LBT on any number of BWPs (e.g., for activating a BWP) at any moment, for example, of an UL transmission (e.g., that is to be) performed by the WTRU. According to embodiments, the WTRU may be configured with (e.g., possible) LBT occasions per any number of and/or sets of BWPs. For example, the possible LBT occasions per BWP may have any of a periodicity and an offset. According to embodiments, a WTRU may be configured with a configurable schedule comprising any of a same period and different offsets per BWP, for example, to enable cycling of LBT occasions per BWP, in a manner similar to that described herein for monitoring of DL transmissions over multiple monitored BWP.

According to embodiments, a WTRU may be configured with UL resources, which may include BWP-specific UL resources. The WTRU may attempt LBT on a monitored BWP which has an upcoming resource applicable to the type of transmission (e.g., required, needed, to be, etc.) performed by the WTRU.

According to embodiments the WTRU may be any of configured with BWP-agnostic UL resources (e.g., UL resources not related to a specific BWP) or scheduled with an UL transmission with frequency resource allocation that may be mapped to any number of BWP(s). The WTRU may cyclically and/or sequentially perform LBT on a set of configured BWPs according to a configurable schedule and may activate the BWP of the set of BWPs for which LBT is successful.

According to embodiments, in a case of successful LBT (e.g. on condition a channel is acquirable) on any number of BWPs, the WTRU may perform an UL transmission on the any number of monitored BWP. The WTRU may (e.g., then) consider the any number of BWPs to be its active BWP(s). According to embodiments, the UL transmission may include any of: (1) a PRACH preamble transmission; (2) an SRS transmission; (3) a transmission on a PUCCH resource; or (4) a PUSCH transmission. For example, a WTRU may be configured with conditional resources on which to perform grant-free or SPS UL transmissions. The condition for transmission may be successful LBT on the BWP and/or set of BWPs. As previously described, the WTRU may (e.g., be expected to) wait for an acknowledgement from a serving cell before considering a BWP active.

According to embodiments, a WTRU may indicate, for example, to the network, any of the acquired BWP(s) and the (e.g., specific) secondary cell(s) (SCell(s)) for which they are valid. For example, the WTRU may transmit an indication on a (e.g., possibly licensed) primary cell (PCell). The WTRU may be configured with UL resources on the PCell, for example, to provide an indication of unlicensed channel acquisition. The UL resources may be implicitly (and/or explicitly) tied to (e.g., associated with) WTRU LBT occasions and, for example, the WTRU may send a message (e.g., a simple message, as short as one bit, but not limited to one bit) to indicate that the LBT on the associated resource was successful.

According to embodiments, a WTRU may determine any of the LBT period and offset of a BWP according to a semi-static configuration. A semi-static configuration may be a configuration that is updated, for example, at a certain time, periodically, via a RRC (re)configuration, etc. Semi-static (re)configuration updates may remain valid for a certain time, for example, up to the next reconfiguration. Semi-static reconfigurations may differ from dynamic adjustments in being triggered by different types of signaling messages. Dynamic configuration may be updated, for example, via an information element in a DCI. Dynamic configurations may (e.g., typically) be processed by a WTRU more rapidly than semi-static configurations, though semi-static configurations may be (e.g., typically more) robust.

According to embodiments, any of the LBT period and offset of at least one BWP may be determined and/or updated in a configurable schedule, for example, based on activity on any number of (e.g., other) BWPs. For example, a WTRU may be configured with any of a fallback or default BWP. In a case where the WTRU is unable to acquire a BWP for UL transmission (e.g., from any of the monitored or configured BWPs) for more than a (e.g., configurable) amount of time, the WTRU may assume (e.g., determine, operate according to, etc.) an updated (e.g., a new) any of LBT period and offset for any of the fallback or default BWP. Such assumption may provide more LBT occasions, for example, to acquire the fallback BWP. In a case of acquisition of the fallback BWP, the WTRU may provide any of an indication or feedback report to the network, for example, for indicating any of the need to use/update the fallback LBT period/offset or a cause of using/updating the fallback LBT period/offset.

Cell Based BWP Activation

Cell based determination and indication of an active BWP are described herein. In a case of DL-based BWP acquisition, a WTRU may determine that a monitored BWP and/or a set of BWPs may be (e.g., used as) an active BWP, for example, upon reception of an initial transmission detected during a monitoring occasion.

According to embodiments, a WTRU may determine that a BWP has become an active BWP, for example, upon reception of an indication on a cell (e.g., another cell, such as a PCell). The indication may include a set of BWPs associated with any number of SCells, for example, for which a network has acquired the channel. The indication may (e.g., also) include a type of LBT, for example, the type of LBT used to acquire the channel (e.g., check whether the channel is acquirable). The indication may include an indicator (e.g., information) indicating whether the WTRU may (e.g., also) use the same channel for transmission during the COT.

According to embodiments, upon determining that any number of monitored BWPs has been activated, a WTRU may pause (e.g., suspend, stop, terminate, cease, etc.) monitoring activity on (e.g., the other) monitored BWPs. According to embodiments, a WTRU may monitor (e.g., continue monitoring) other monitored BWPs, and may be configured with measurement gaps in the active BWP, for example, to perform cross-BWP monitoring.

According to embodiments, multiple BWPs may share a monitoring occasion. In such a case, the WTRU may monitor any (e.g., both) of the BWPs for a transmission, for example, indicating the channel is acquired. The WTRU may receive an indicator indicating (e.g., may be indicated) whether the channel acquired is a single one of the BWPs sharing a monitoring occasion or whether it is the aggregate of the shared BWPs.

According to embodiments, any of the monitoring period and offset of a BWP may be determined by semi-static configuration. According to embodiments, any of the monitoring period and offset of any number of BWPs may be determined and/or updated in a configurable schedule, for example, based on activity on any number of (e.g., other) BWPs. For example, a WTRU may be configured with any of a fallback or default monitored BWP. In a case where the WTRU has not received a DL transmission on any BWP, for example, for a duration exceeding an (e.g., possibly configurable) amount of time, a WTRU may assume an updated (e.g., new) monitoring period and/or offset for any of the fallback or default monitored BWP. In such a case, more DL channel acquisition opportunities may be provided on any number of BWPs, for example, to enable reconfiguration of the WTRU.

Figure 2:
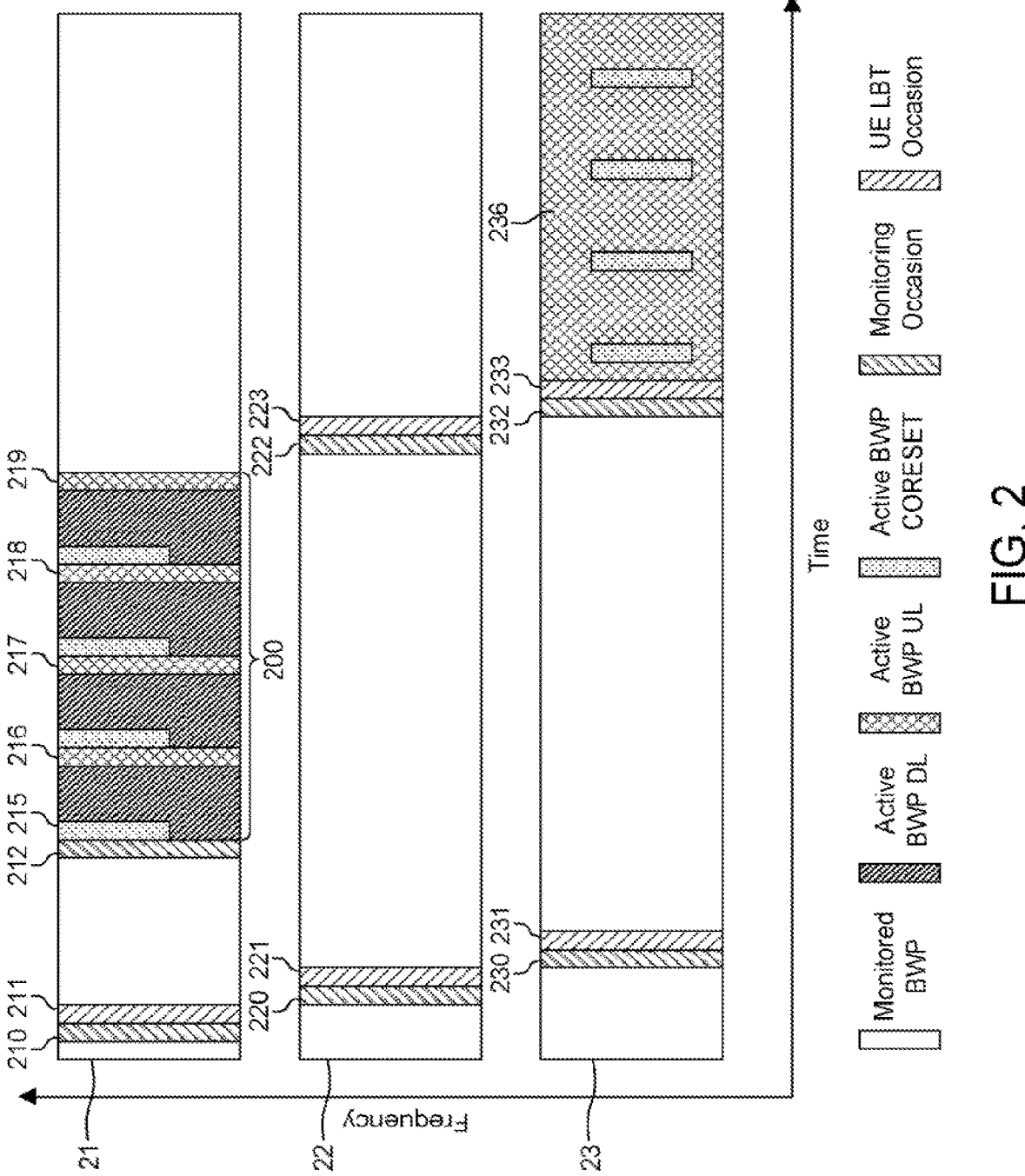
FIG. 2 is a diagram illustrating an unlicensed carrier that is segmented according to an embodiment.

FIG. 2 is a diagram illustrating an unlicensed carrier that is segmented according to embodiments. For example, as shown in FIG. 2, an unlicensed carrier may be segmented into three BWPs 21, 22, 23, which may be used in and/or applied to any of embodiments described herein. A WTRU may have different monitoring occasions 210, 212, 220, 222, 230, 232 on each monitored BWP 21, 22, 23. Furthermore, the WTRU may have different LBT occasions 211, 221, 223, 231, 233 (e.g., time instances to attempt LBT) on the monitored BWPs 21, 22, 23. For simplification reasons, illustrated monitored BWPs 21, 22, 23 may be (e.g., used as) any of UL BWP or DL BWP. FIG. 2 illustrates cyclic monitoring of the three BPWs 21, 22, 23 according to a configurable schedule. The period of the configurable schedule, for example, as illustrated in FIG. 2, may be a time difference between two successive monitoring occasions 210, 212 of a same BWP 21. The different offsets of the three BWPs may be configured such that any of the monitoring and LBT occasions do not overlap for the different BWPs, for example, so that the monitoring and/or channel listening may be performed sequentially by a WTRU for the three BWPs 21, 22, 23.

As illustrated in FIG. 2, a WTRU may monitor DL transmissions in a first BWP 21 during a first monitoring occasion 210. As illustrated in FIG. 2, in a case where no transmission is successfully received by the WTRU during the first monitoring occasion 210, the WTRU may then listen to the channel of the first BWP 21 during the first channel listening occasion 211 (e.g. if it needs to make an UL transmission), occurring just after the first monitoring occasion 210. As illustrated in FIG. 2, there may be a case where the channel of the first BWP 21 may be any of not successfully acquired by the gNB for DL transmission or not needed (e.g., required) by the gNB for DL transmission during the first channel listening occasion 211. In such a case, the WTRU may switch to the second BWP 22, for example, for performing any of monitoring or listening. For example, in such a case, the WTRU may monitor DL transmissions in the second BWP 22 during a subsequent monitoring occasion 220 (e.g., occurring after the first listening occasion 211 of the first BWP 21). Further in such a case, no transmission may be (e.g., successfully) received by the WTRU during the monitoring occasion 220, and the WTRU may listen to the channel of the second BWP 22 during a subsequent listening occasion 221 (e.g. if needed or required for an UL transmission) and, for example, occurring just after the monitoring occasion 220. FIG. 2 further illustrates that the second channel 22 may not be successfully acquired during the subsequent listening occasion 221 (or is not needed or required at that time) and that the WTRU may switch to the third BWP 23 for monitoring DL transmissions in the third BWP 23 during a further monitoring occasion 230 (e.g., occurring after the subsequent listening occasion 221 of the second BWP 22). The different offsets of the configurable schedule may be determined, for example, to allow the WTRU to sequentially and/or repeatedly monitor the set of BWPs in successive monitoring and channel listening occasions for the different BWPs. Although FIG. 2 illustrates a configurable schedule where a monitoring occasion 220 of a (second) BWP 22 is scheduled just after the listening occasion 211 of the preceding (first) BWP 21, the present disclosure is not limited to such kind of schedule, and any configurable schedule may include any (e.g., different) amounts of time between non-overlapping (monitoring/listening) occasions of different BWPs according to embodiments.

As illustrated in FIG. 2, a WTRU may fail to acquire the channel for the third BWP 23 or may not need to acquire the channel at that time, for example, because of not having any pending UL transmission, during the listening occasion 231. The WTRU may switch (e.g., back) to the first BWP 21 and to the next monitoring occasion 212 (e.g., occurring a fixed amount of time after the previous monitoring occasion 210 of the same BWP 21). As illustrated in FIG. 2, in a case of (e.g., after) a successful reception of an activation indication in the first BWP 21 during a monitoring occasion 212, the WTRU may begin monitoring that BWP's 21 CORESETs 215, for example, to receive scheduling information. Furthermore, some resource may be assigned for UL transmissions 216, 217, 218, 219 (e.g., possibly) not needing or requiring LBT (e.g., UL transmissions such as short PUCCH). In a case of completion of the transmission opportunity 200, the WTRU may assume that all BWPs are (e.g., back to) being monitored and the WTRU may resume the cyclic monitoring of the three BWPs 21, 22, 23. In such a case, the WTRU may cease monitoring (e.g., other) BWPs 22, 23 when at least one BWP 21 becomes active. According to embodiments, a WTRU may maintain cyclic monitoring of a set of BWPs in a case where any number of (e.g., even one of) the monitored BWPs is activated.

As illustrated in FIG. 2, in a case of determining, by the WTRU, that an UL transmission needs to be made, the WTRU may begin performing LBT in its LBT occasions 211, 221, 223, 231, 233. For example, the WTRU may receive a BWP agnostic grant for an uplink transmission during the time interval 200 during which the first BWP 21 is active. The WTRU may use the first BWP 21 for the UL transmission associated with the BWP agnostic grant if the channel occupancy time (COT) for the active BWP 21 (e.g., after completion of the BWP agnostic grant UL transmission) is not exceeding (e.g., or going to exceed) a maximum channel occupancy time (MOOT). If the BWP agnostic grant for an UL transmission is received at a point where the COT is close to the MOOT, the WTRU may (e.g., then) resume cyclic monitoring of the three BWPs, for example, to look for another BWP 22, 23 to activate. The WTRU may switch to the next (e.g., second) BWP 22 of the configurable schedule. As illustrated in FIG. 2, a WTRU may fail to detect a DL transmission in the next monitoring occasion 222 of the second BWP 22, and may fail to acquire the channel of the second BWP 22 in the subsequent listening occasion 223. The WTRU may (e.g., then) switch to the third BWP 23, may fail to detect any DL transmission during the next monitoring occasion 232 of the second BWP 22, but may succeed in acquiring the channel of the third BWP 23 in the subsequent listening occasion 233. The WTRU may (e.g., thus) acquire the third BWP 23, which may be considered as (e.g., deemed to be) active 236. In a case of activating such a BWP 23, the WTRU may operate such (e.g., assume) that some DL resources are also applicable (e.g., without requiring DL LBT), for example DL resources for any of scheduling or HARQ-ACK.

Activating a BWP from a Function

Determining an active BWP according to a function is described herein. According to embodiments, a WTRU may operate as though (e.g., assume that) any number of BWPs is active. The active BWP may cycle through (e.g., all the possible) BWPs in a case of any of the WTRU has not performed LBT or the WTRU has not (e.g., successfully) received information indicating a BWP acquisition from the cell. Information may be any of a transmission from the cell (e.g., any of a DCI, a SSB, a RS, or a preamble like transmission, etc.), or any signaling message according to the embodiments described herein. For example, at any monitoring occasion (e.g., at every monitoring occasion as described herein), a WTRU may assume that the BWP being monitored is the active BWP. Furthermore, that BWP (e.g., assumed to be active) may remain the active BWP until another BWP is to be monitored according to the configurable schedule.

According to embodiments, the active BWP may be determined according to a COT timer. A COT timer may be started in a case where a BWP is (e.g., becomes) active, for example, to monitor the duration of the channel occupancy. The COT timer may be set as a maximum channel occupation time (MCOT) value derived, for example, according to regulations, rules, requirements, etc. When a COT timer is running, the active BWP may be the BWP that was active when the timer was started. When the COT timer is not running, the active BWP may be determined as a function of any of the following: (1) a BWP with a most recent monitoring occasion; (2) any of a subframe, slot, or symbol number; (3) any of a configured or default BWP; and (4) a random seed. In the case of any of the configured or default BWP, the WTRU may be configured with a default BWP and may have any of measurement gaps or measurement resources configured in that default BWP, for example, to attempt reception in monitoring occasions of other BWPs.

Virtual Active BWP

Virtual active BWP is described herein. In NR, configuring a WTRU with a set of (e.g., real, for example, in contrast to virtual) BWPs may include, for each BWP of the set of BWPs, providing the WTRU with the following parameters: (1) a subcarrier spacing, indicated by the NR higher layer parameter subcarrierSpacing, (2) a cyclic prefix indicated by the NR higher layer parameter cyclicPrefix, (3) a first Physical Resource Block (PRB) and a number of contiguous PRBs indicated by the NR higher layer parameter locationAndBandwidth, the first PRB being a PRB offset relative to the PRB indicated by NR the higher layer parameters offsetToCarrier and subcarrierSpacing, (4) an index in the set of BWPs indicated by the respective higher layer parameter bwp-Id, and (5) a set of BWP-common and BWP-dedicated parameters indicated by the NR higher layer parameters bwp-Common and bwp-Dedicated.

In NR, for each BWP, a WTRU may be configured with Control Resource Sets (CORESETs), as previously described. A CORESET may be a time-frequency resource, for example, in which the WTRU may try to decode candidate control channels using any number of search spaces.

According to embodiments, a WTRU may be configured with a virtual BWP, which may also be referred to as a virtual active BWP. A virtual BWP may be a BWP configured with a part of the NR BWP configuration parameters described above. For example, such a configuration may be provided by a serving cell (e.g., as real configuration parameters), wherein the parameters related to physical resources, such as for example, the first PRB, may remain unconfigured or configured to a virtual value. For example, the virtual BWP may be configured with any of a subcarrier spacing, a cyclic prefix, and a bandwidth derived from parameters provided by the serving cell. According to embodiments, a virtual BWP configuration may differ from a real BWP configuration, for example, only by having a virtual location in the spectrum. The mapping of the virtual location to a real location (e.g., time and/or frequency location and/or resource) in the spectrum may be determined according to an outcome of LBT. The mapping of the virtual active BWP to a physical BWP may be associated with what (or which) BWP has been acquired by any of the cell or the WTRU, for example, using LBT. The WTRU may be configured with any of resources to attempt LBT (e.g., LBT occasion) or resources to attempt reception in a monitoring occasion on physical BWPs. Upon determining a physical BWP is active, the WTRU may translate (e.g., apply, adapt, modify, use, etc.) all resources tied to (e.g., associated with) its virtual active BWP to the physical BWP. The mapping may use configurable rules and/or may be indicated in the BWP acquisition signaling. For example, the mapping from virtual resource to physical resources may be associated with acquisition by the WTRU of a set of physical resources, e.g. by determining that the channel is free using LBT. The WTRU may cycle through a set of frequency locations in a specific order, for example, such that if a frequency location is deemed busy, the WTRU may proceed to determine whether the following frequency location is free or busy. Upon determining that a frequency location is free, the WTRU may map the virtual BWP to the physical resources of the frequency location. Any of the set of frequency locations and the order in which they may be cycled may be any of pre-determined or configurable (e.g. semi-statically or dynamically, such as in the resource grant). According to embodiments, the WTRU may determine the mapping from a reception of a BWP acquisition signal, for example, from the gNB. Such a signal may indicate the set of physical resources to which a virtual BWP may be mapped. According to embodiments, the mapping between a virtual BWP and physical resources may depend on a parameter of the grant. The parameter may include any of: a timing of the grant, a duration of the grant, a frequency resource allocation of the grant, a quasi-collocation indication, a service type, LBT (if any) needed or required for the transmission, or a redundancy version of the transmission.

Configuring a WTRU with a set of (e.g., real) BWPs corresponds to assigning a data transmission or reception to the WTRU in a fixed frequency location. In unlicensed spectrum, such a frequency location may be deemed occupied during an intended time of transmission. This may lead to dropping of a transmission and increasing over-all latency. According to embodiments, in the case of configuring a WTRU with a virtual BWP, all the transmission parameters may be known prior to the transmission, except for the frequency location. In such a case, the frequency location may (e.g., then) be determined from a set of valid locations based on any of LBT and frequency selection rules known a priori. For example, a WTRU may cycle through the frequency locations in a pre-determined manner known at both the WTRU and the gNB. According to embodiments, configuring a WTRU with a virtual BWP may provide improved transmission performance and over-all latency of BWPs in NR unlicensed spectrum.

BWP Deactivation as a Function of a Received Signal

BWP deactivation as a function of a received signal is described herein. According to embodiments, a WTRU may operate with (e.g., assume that) a plurality of configured BWPs that may be active at a same point in time. In such a case, the WTRU may monitor the monitoring regions of (e.g., all the) active BWPs, for example, to determine whether the BWP was acquired by the cell. In such a case (e.g., similarly), the WTRU may attempt LBT on any of the active BWPs. In a case of being informed by the cell that a BWP has been acquired, or, for example, in a case of having a successful LBT on a BWP, the WTRU may start a timer and may consider (e.g., all other) BWPs deactivated, for example, until the timer expires.

Channel Occupancy Time (COT)

Channel occupancy time is described herein. A channel may be occupied by a node, or pair of nodes, for a maximum amount of time. Such a maximum may be referred to as maximum channel occupancy time (MCOT). The MCOT may be determined to comply with a regulation.

According to embodiments, in a case of a BWP being (e.g., becoming) active for a WTRU, the WTRU may start a timer (e.g., set to any value up to and including the MOOT). In the case of an expired timer (e.g., upon expiration of the timer), the WTRU may operate such that (e.g., assume) the BWP is not (e.g. no longer) active and may return to the monitored state. The WTRU may have (e.g., operate, manage, etc.) multiple timers (e.g., one per active BWP). In a first example, the WTRU may run multiple timers concurrently (e.g., at a same point in time). In a second example, the multiple timers may have different values. In a third example, the WTRU may run multiple timers, set to different values, concurrently. A WTRU may maintain one timer per active BWP, such that different timers may have had different starting values and may be at different points at any given moment.

According to embodiments, the channel occupancy time (COT) timer may be set to a dynamically indicated value. For example, a WTRU may not receive a DL transmission in the first slot that a cell acquires a BWP, and in such a case, the cell may need to relinquish (e.g., release) the BWP, for example, faster than the WTRU may expect. In such a case, the first transmission to a WTRU may include the value to use by the WTRU for the COT timer. In another example, the WTRU may receive a timer value (e.g., an update to the timer value) for the COT timer in a second (or any subsequent) transmission to the WTRU.

According to embodiments, a WTRU may reset a COT timer in a case where any of the following occurs. In a first case, the COT timer may be reset according to (e.g., upon receiving) an indication to switch another active BWP. For example, the first case may be possible (e.g., only) if the new active BWP is on orthogonal resources of the original active BWP. In a second case, the COT timer may be reset according to (e.g., upon receiving) an indication to reset the COT timer. For example, the cell may perform LBT (e.g., immediately) at the end of a COT and may (e.g., immediately) reacquire a BWP for a new COT. The indication may be any of explicit (e.g., included in a DCI) or implicit (e.g., tied to and/or associated with the transmission of a specific signal like an RS or SSB). In a third case, the COT timer may be reset according to (e.g., upon successful) LBT by the WTRU. The COT timer may, for example, be restarted at the beginning of an UL transmission, for example, subsequent to the successful LBT.

According to embodiments, a WTRU may be provided resources in an active BWP, for example, to attempt LBT on any of the same or other BWPs before the expiration of the COT timer. Such resources may be configured as zero power reference signal (ZP RS) (e.g., ZP CSI-RS).

According to embodiments, in a case where LBT is performed while the WTRU has an active BWP, there may be restrictions on, for example, the beams the WTRU may use for LBT. For example, the WTRU may perform LBT using the beam (or set of beams) that it is currently configured with for the active BWP. In another example, the WTRU may be indicated (e.g., by the serving cell) the beam (or set of beams) to use for LBT performed while a BWP is active.

Scheduling on Active BWP

Scheduling on active BWP is described herein. According to embodiments, an indication of activation of a BWP (e.g., from a cell) may (e.g., also) include scheduling information, for example, for any of a first DL assignment or an UL grant. In a case of a BWP (or set of BWPs) being activated, the WTRU may monitor (e.g., begin monitoring) PDCCH search spaces in any number of CORESETs, for example, that are in its active BWPs.

According to embodiments, a WTRU may receive an UL grant for an UL transmission that may be transmitted on any of a plurality of BWPs (e.g. the UL transmission may be performed on one, or more, of a set or sets of applicable BWPs). The set of applicable BWPs may be any of semi-statically configured or determined by the UE, for example, from an element of the UL grant. Such an UL grant for an UL transmission that may be transmitted on any of a plurality of BWPs may be referred to as a BWP agnostic UL grant. The WTRU may perform the transmission without LBT (and/or with short LBT) if, once the timing of the grant is valid, a WTRU has an active BWP (e.g. with an ongoing COT) for which the UL grant is applicable. In a case where the WTRU does not have an active BWP (e.g. with an ongoing COT) for which the UL grant is applicable, the WTRU may perform LBT on any of the applicable BWPs. In a case of (e.g., successfully) acquiring a (e.g., at least one applicable) BWP, the UE may perform the granted UL transmission in that BWP.

Hybrid Automatic Repeat Request (HARQ) Transmission

Hybrid automatic repeat request (HARQ) transmission is described herein. According to embodiments, for DL HARQ, in a case where a WTRU has (e.g., the appropriate) resources to transmit a HARQ feedback in the same COT as the DL data transmission, the WTRU may not (e.g., need to) perform LBT, for example, prior to the HARQ feedback transmission and the WTRU may proceed (e.g., to operate) in the unlicensed spectrum as in a licensed spectrum. In a case where HARQ feedback resources are not available (e.g., the DL data transmission occurs such that applicable HARQ feedback resources are not available) within the COT, the WTRU may keep the HARQ ACK-NACK value, for example, for (e.g., possible, later) HARQ feedback transmission (e.g. on an active BWP). The WTRU may be polled by the cell to transmit such un-transmitted HARQ feedback values. The polling may be done in another COT and may be on another BWP. The HARQ feedback values may be transmitted upon a new BWP activation, for example, leading to new resources for feedback transmission. For example, a WTRU may receive a DL assignment in one of the last slots of a COT. The WTRU may attempt LBT on any of the same or another BWP (e.g., depending on the LBT occasion pattern). In a case where the WTRU acquires (e.g., is able to acquire) any of the same or another BWP, for example, within a specific amount of time, the WTRU may transmit HARQ feedback values on the resources associated with (e.g., tied to) the new activated BWP.

According to embodiments, for UL HARQ, in a case where the UL data transmission is performed at a time such that a WTRU may not receive (e.g., expect to receive) a HARQ feedback within the same COT, the WTRU may keep the UL data in its buffer. The WTRU may continue monitoring the monitored BWPs. In a case of receiving an indication of a new active BWP, the WTRU may flush its buffer, for example, if it is not scheduled for retransmission of the UL data from the previous COT.

Radio Link Monitoring (RLM)

Radio link monitoring (RLM) is described herein. According to embodiments, a WTRU may perform RLM on a (e.g., possibly) configurable set of RSs, for example, on any number of (e.g., active) BWPs. For example, in a case of a BWP being (e.g., becoming) active, the WTRU may perform (e.g., the relevant) measurements, for example, to determine if there is any radio link failure (RLF).

According to embodiments, a WTRU may not be indicated any active BWP, for example, by not receiving any control signaling indicating an active BWP, for a (e.g., certain) duration. According to this specific embodiment, in a case of any (e.g. all) BWP(s) being (e.g., remaining) inactive for a (e.g., specific) period of time (e.g., exceeding a configurable amount of time), the WTRU may declare RLF. The WTRU may be configured to measure a subset of RSs (e.g., in a case where such RS may be expected even in BWPs without valid activation indication), for example, to perform RLM measurements on that (e.g., possibly inactive) BWP. There may be a case where the WTRU may not detect any transmission for such RSs, for example in a case where the network (e.g., the gNB) has not (e.g., successfully) acquired the channel for the concerned BWPs, for example, to transmit a signal for the concerned RSs. The WTRU may start a timer in a case of receiving a last RS used for RLM measurements. The WTRU may restart the timer in any of a case where (e.g., whenever) it determines that a BWP has been activated, or in a case where (e.g., whenever) it receives an RS on an inactive BWP. Upon expiration of the timer, the WTRU may declare (e.g., report) a RLF.

According to embodiments, a WTRU may perform link monitoring (LM), for example, per BWP (e.g., BWP-LM). The WTRU may maintain any of measurements and timers per any of BWP or set of BWPs. A BWP link failure (BWP-LF) event may be determined in a case where a measurement taken on a resource transmitted on the BWP (or set of BWPs) exceeds a value (e.g., falls below a first threshold). The WTRU may indicate (e.g., report, transmit information indicating, etc.) to the network any number of (e.g., every) BWP-LF event. The WTRU may indicate (e.g., report, transmit information indicating, etc.), for example, to the network, a BWP-LF upon any number of such BWP-LF events taking place, for example, within a time window. For example, a WTRU may trigger a timer upon determining a first BWP-LF event. If the number of BWP-LF events exceeds a value (e.g., exceeds a second threshold), for example, before expiration of the timer, the WTRU may declare (e.g., report, transmit information indicating, etc.) BWP-LF for the BWP.

According to embodiments, in a case of BWP-LF occurring on any number of BWPs (or set of BWPs), the WTRU may modify any of the monitoring period, monitoring period offset, LBT occasion period, or LBT occasion period offset, for example, of another BWP (e.g., a default BWP), for example to increase the frequency of any of the monitoring or listening occasions.

Figure 3A:
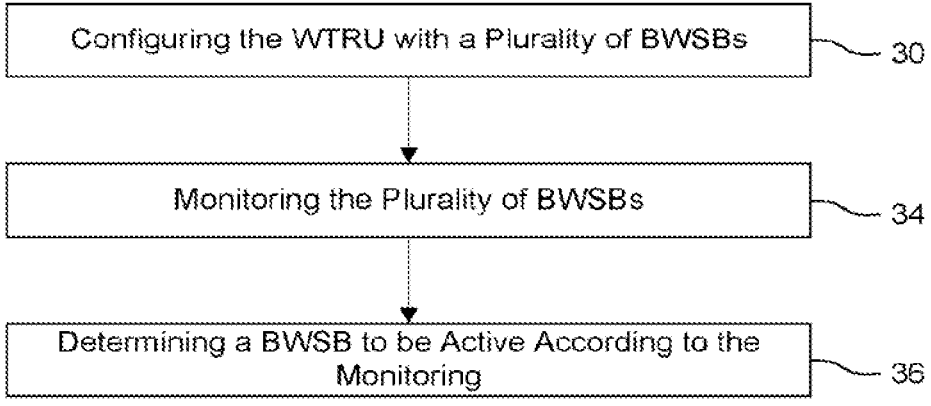
FIG. 3A is a diagram illustrating an example of a method for use in a WTRU configured with a set of BWPs in unlicensed spectrum according to an embodiment.

FIG. 3A is a diagram illustrating a method for use in a WTRU configured with a set of BWSBs in unlicensed spectrum according to an embodiment. As illustrated in the flowchart of FIG. 3A, the method may include a step 30 of configuring the WTRU with a plurality of BWSBs, for example, for accessing a serving cell within an unlicensed frequency spectrum. The WTRU may be configured with the plurality of BWSBs by, for example, receiving configuration parameters from the serving cell. The WTRU may apply the configuration parameters as previously described. The method may include a step 34 of monitoring the plurality of BWSBs, for example, using any of a monitoring period or one offset per BWSB. The monitoring period and the monitoring offsets may be part of a configurable schedule of the WTRU. The monitoring period may be configured, for example, to adjust the periodicity of monitoring a (e.g., any, each, all, etc.) BWSB (e.g., the frequency at which each BWSB may be monitored). The different offsets of the different BWSBs may be configured to different values, for example, to allow a sequential monitoring of the plurality of BWSBs by the WTRU.

The method may include a step 36 of determining a BWSB is active (e.g., activating a BWSB), for example, based on the monitoring. The WTRU may (e.g., try to) acquire the channel of the BWSB, for example, by performing LBT at a time determined according to any of the monitoring period and the monitoring offset of that BWSB during a monitoring duration (which may be referred to as a LBT occasion). In a case of (e.g., successful) UL channel acquisition by the WTRU, the monitored BWSB may be (e.g., determined to be) active (e.g., activated). The WTRU may (e.g., try to) receive a signal from the serving cell in the BWSB at a time determined according to any of the monitoring period and the monitoring offset of that BWSB, for example, during a monitoring duration (which may be referred to as a monitoring occasion). In a case of (e.g., successful) reception of a signal from the serving cell during the monitoring occasion, the monitored BWSB may be (e.g., determined by the WTRU to be) active (e.g., activated by the WTRU).

Figure 3B:
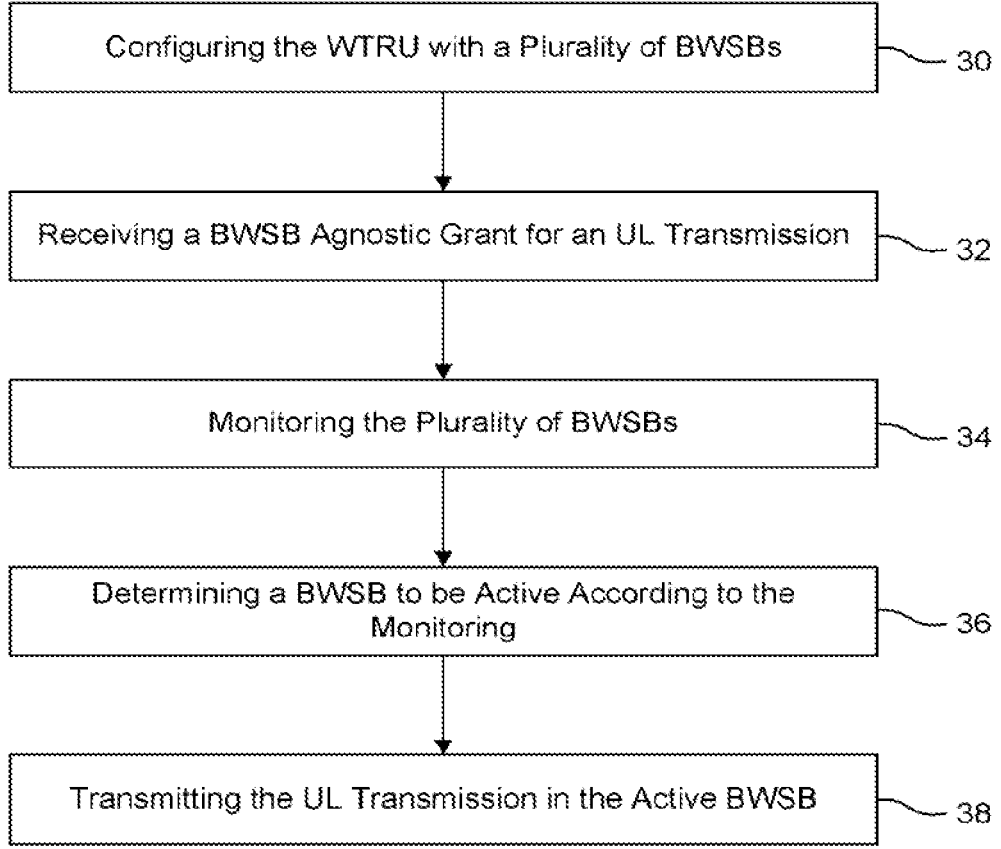
FIG. 3B is a diagram illustrating another example of a method for use in a WTRU configured with a set of BWPs in unlicensed spectrum according to an embodiment.

FIG. 3B is a diagram illustrating a method for use in a WTRU configured with a set of BWSBs in unlicensed spectrum according to an embodiment. As illustrated in the flow chart of FIG. 3B, the method may include a step 30 (which may be similar to the step 30 of FIG. 3A) of configuring the WTRU with a plurality of BWSBs, for example, for accessing a serving cell within an unlicensed frequency spectrum. The method may include a step 32 of receiving a BWSB agnostic grant for an UL transmission (e.g., the grant is not associated with and/or tied to a BWSB). In a case where the WTRU has an active BWSB, the WTRU may perform the UL transmission associated with the BWSB agnostic grant in that active BWSB. In a case where the WTRU does not have an (e.g., any active) BWSB (e.g. all the configured BWSB are inactive), the WTRU may monitor the plurality of BWSBs in a step 34, for example, according to any of the monitoring period and the monitoring offsets (e.g., as previously described). For example, the WTRU may any of repeatedly and sequentially monitor the plurality of the BWSBs according to the configurable schedule as previously described. The method may include a step 36 of activating a BWSB according to the monitoring. For any (e.g., each, all) BWSB, the WTRU may (e.g., try to, attempt to, etc.) decode a DL signal, for example, from the serving cell, at the monitoring occasion corresponding to the monitored BWSB. In a case of not receiving (e.g., a failure to receive) a signal during the monitoring occasion, the WTRU may attempt to acquire the channel of the BWSB, for example, by performing LBT at the LBT occasion corresponding to the monitored BWSB. In a case of (e.g., success for) any of DL signal reception or LBT (e.g., the channel being acquirable), the BWSB may be activated. For any (e.g., each, all) BWSB, the WTRU may (e.g., directly, attempt to, etc.) acquire the channel of the BWSB (e.g., without any of having, needing, or initially trying to receive a DL signal in the BWSB) at the LBT occasion corresponding to the monitored BWSB.

The method may include a step 38 of applying the BWSB agnostic grant in the active BWSB, for example, by performing (e.g. transmitting) the UL transmission associated with the grant in that active BWSB.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such.

Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A wireless transmit receive unit (WTRU), comprising a processor and a transceiver operatively coupled to the processor, the processor being configured to:

receive configuration information indicating a virtual bandwidth part (BWP), wherein parameters of the virtual BWP are associated with virtual resources that are not associated with a specific frequency location;

receive grant information, wherein the grant information is different from the configuration information, wherein the grant information indicates scheduling a transmission in the virtual BWP, and wherein the grant information further indicates a time and frequency resource allocation for the transmission;

determine, based on a successful listen before talk (LBT) procedure, that a channel is available in a BWP of a plurality of BWPs;

translate the virtual resources associated with the virtual BWP to physical resources of the BWP that is determined to include the available channel based on at least the time and frequency resource allocation for the transmission and based on the channel being available in the BWP; and transmit the transmission in the BWP based on the grant information and the physical resources, wherein the BWP used for the transmission is selected by the WTRU responsive to the LBT procedure being successful.

2. The WTRU of claim 1, wherein the BWP is in unlicensed frequency spectrum.

3. The WTRU of claim 1, wherein the parameters of the virtual BWP comprise any of a subcarrier spacing, a cycle prefix and a bandwidth.

4. The WTRU of claim 1, wherein the processor is further configured to receive BWP activation information indicating the physical resources to which the virtual resources are to be translated.

5. The WTRU of claim 1, wherein the virtual resources are translated to the physical resources based on a configurable rule.

6. The WTRU of claim 1, wherein the virtual resources are translated to the physical resources based on a parameter of the grant information, wherein the parameter comprises any of a quasi-collocation indication, a service type, an indication of whether LBT is to be performed for the transmission, and a redundancy version of the transmission.

7. The WTRU of claim 1, wherein the processor is further configured to monitor the plurality of BWPs according to periodic monitoring occasions, and wherein each of the plurality of BWPs is monitored repeatedly until the channel is determined to be available in the BWP.

8. The WTRU of claim 7, wherein the periodic monitoring occasions comprise a set of periodic monitoring occasions associated with a time offset per BWP, wherein each BWP is associated with a different time offset.

9. The WTRU of claim 7, wherein the configuration information indicates the periodic monitoring occasions to be used for monitoring the plurality of BWPs.

10. The WTRU of claim 1, wherein the grant information indicates resources not specific to any BWP of the plurality of BWPs.

11. The WTRU of claim 1, wherein the configuration information indicates the parameters of the virtual BWP associated with the virtual resources.

12. A method implemented in a wireless transmit receive unit (WTRU), the method comprising:

receiving configuration information indicating a virtual bandwidth part (BWP), wherein parameters of the virtual BWP are associated with virtual resources that are not associated with a specific frequency location;

receiving grant information, wherein the grant information is different from the configuration information, wherein the grant information indicates scheduling a transmission in the virtual BWP, and wherein the grant information further indicates a time and frequency resource allocation for the transmission;

determining, based on a successful listen before talk (LBT) procedure, that a channel is available in a BWP of a plurality of BWPs;

translating the virtual resources associated with the virtual BWP to physical resources of the BWP that is determined to include the available channel based on at least the time and frequency resource allocation for the transmission and based on the channel being available in the BWP; and transmitting the transmission in the BWP based on the grant information and the physical resources, wherein the BWP used for the transmission is selected by the WTRU responsive to the LBT procedure being successful.

13. The method of claim 12, wherein the virtual resources are translated to the physical resources based on a parameter of the grant information, and wherein the parameter comprises any of a grant timing, a grant duration, a frequency resource allocation, a quasi-collocation indication, a service type, an indication of whether listen LBT is to be performed for the transmission, and a redundancy version of the transmission.

14. The method of claim 12, wherein the virtual resources are translated to the physical resources by performing LBT in the channel of the BWP and by acquiring the physical resources in the channel.

15. The method of claim 12, further comprising monitoring the plurality of BWPs according to periodic monitoring occasions, wherein each of the plurality of BWPs is monitored repeatedly until the channel is determined to be available in the BWP.

16. A wireless transmit receive unit (WTRU), comprising a processor and a transceiver operatively coupled to the processor, the processor being configured to:

receive first configuration information indicating a virtual bandwidth part (BWP), wherein parameters of the virtual BWP are associated with virtual resources that are not associated with a specific frequency location;

receive second configuration information indicating periodic monitoring occasions to be used for monitoring a plurality of BWPs, wherein the periodic monitoring occasions comprise a set of periodic monitoring occasions associated with a time offset per BWP wherein each BWP is associated with a different time offset;

receive at least one signal from a network element in a monitoring occasion of a BWP of the plurality of BWPs based on monitoring the plurality of BWPs according to the periodic monitoring occasions;

responsive to the at least one signal received in the BWP, translate the virtual resources associated with the virtual BWP to physical resources of the BWP; and receive, from the network element, a transmission in the physical resources of the BWP.

17. The WTRU of claim 16, wherein the parameters of the virtual BWP comprise any of a subcarrier spacing, a cycle prefix and a bandwidth.

18. The WTRU of claim 16, wherein the processor is further configured to receive BWP activation information indicating the physical resources to which the virtual resources are to be translated.

19. The WTRU of claim 16, wherein each of the plurality of BWPs is monitored repeatedly until the at least one signal is received in the BWP.

\* \* \* \* \*